Figure 1:
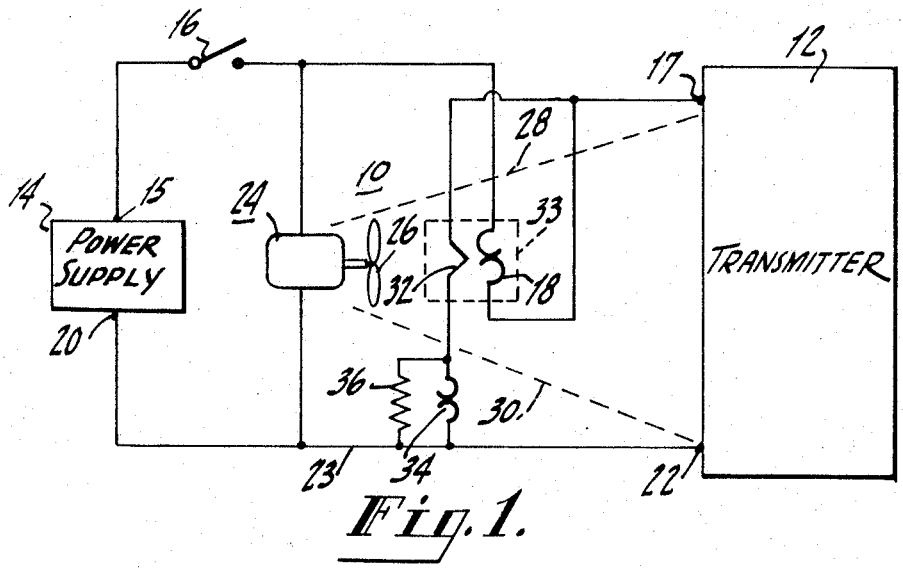

March 14, 1967 D. A. COLBY ETAL 3,309,574
PROTECTIVE COOLING SYSTEM
Filed April 30, 1964

INVENTORS
DON A. COLBY &
WALTER C. PAINTER
BY Morris Rabkin
Attorney 3,309,574
PROTECTIVE COOLING SYSTEM
Don A. Colby, Eightyfour, and Walter C. Painter, Bethel Park, Pa., assignors to Radio Corporation of America, a corporation of Delaware
Filed Apr. 30, 1964, Ser. No. 363,725
4 Claims. (Cl. 317—40)

This invention relates generally to means for cooling, and more particularly to improved, fail-safe apparatus for cooling heavy-duty, electrical or electronic equipment. The fail-safe, cooling apparatus of the present invention is particularly useful for cooling radio transmitters designed for continuous operation.

It has been proposed to protect heat-generating, electrical equipment by employing a thermostat to sense the temperature of the equipment and to interrupt current to the equipment when the temperature of the thermostat reaches a critical temperature. Since this critical temperature may be relatively high, it is not always practical or possible to place the sensing thermostat in direct contact with the heated parts of the equipment. Also, it is not practical to sense the temperature of all of the heat producing components. When the sensing thermostat is spaced from the heated parts, its ability to sense the temperature of these parts quickly is decreased, and the parts may be overheated and ruined before power to the equipment can be interrupted. It has also been proposed to protect heat-generating equipment from overheating by employing apparatus including an air blower and an air pressure actuated, vane-type, mechanical switch for de-energizing the equipment in the event of a failure of the blower. While the aforementioned protective means are satisfactory for some electrical installations, they leave something to be desired in certain applications in that they either depend upon mechanically moving parts or they are too slow in providing the necessary protection. Also, neither of the aforementioned protective means compensates for the ambient temperature of the cooling medium.

It is an object of the present invention to provide improved, fail-safe, cooling apparatus to protect heat-generating equipment quickly and efficiently in the event of a failure of the cooling apparatus.

Another object of the present invention is to provide improved, fail-safe, cooling apparatus for protecting electrical equipment over a relatively wide range of ambient temperatures.

Still another object of the present invention is to provide improved, fail-safe, cooling apparatus for electrical equipment that will permit intermittent use of the protected equipment in the event of a failure of the cooling apparatus.

A further object of the present invention is to provide improved, fail-safe, cooling apparatus of the type described that is relatively simple in structure, inexpensive to manufacture, and highly efficient in use.

Briefly stated, the improved, fail-safe apparatus of the present invention, in one form, comprises a fluid circulator disposed to direct a stream of cooling fluid onto, and preferably through, the equipment to be cooled. A sensing thermostat and a heater, disposed in a heat-exchange relationship with each other, are disposed in the stream of the cooling fluid to be cooled thereby. The heat-generating equipment and the heater are electrically connected through the sensing thermostat to be energized from a power supply. If the fluid circulator should fail, that is, break down, or if the stream of cooling fluid should reach a temperature that is too high for cooling the equipment adequately, the heater heats the sensing thermostat to a temperature at which it is actuated to electrically disconnect the equipment from the power supply. The heater may be connected to the power supply through a normally closed, compensating thermostat, the latter being shunted by a resistor. The compensating thermostat is adapted to open at a temperature below the actuating temperature of the electrically heated, sensing thermostat. The compensating thermostat is disposed to sense the ambient temperature of the cooling fluid and to limit the flow of current to the electrically heated, sensing thermostat when the temperature of the cooling fluid is above that at which the compensating thermostat opens.

Figure 2:
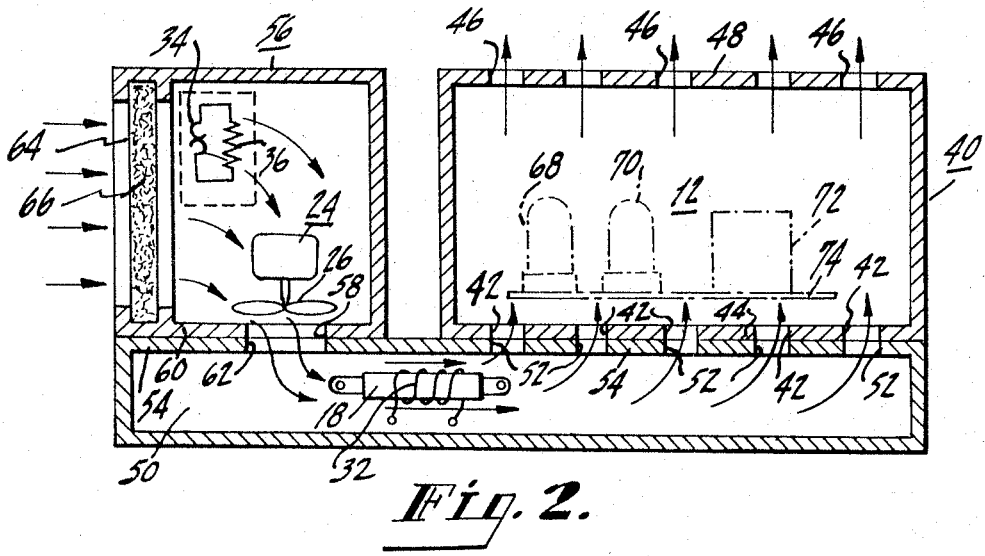

The novel features of the present invention, both as to its organization and method of operation, as well as additional objects and advantages thereof, will be understood more fully when considered in connection with the accompanying drawing, in which similar reference characters represent similar parts throughout, and in which:

FIG. 1 is a schematic diagram of one form of the improved, fail-safe, cooling apparatus according to the present invention; and FIG. 2 is a cross-sectional view of one embodiment of the physical disposition of the components of the improved fail-safe cooling apparatus of the present invention.

Referring, now, particularly to FIG. 1 of the drawing, there is shown improved, fail-safe, cooling apparatus 10 electrically connected to provide fail-safe cooling for a heat-generating device, such as a continuously operated, heavy-duty, radio transmitter 12, for example. The transmitter 12 is energized from a power supply 14 which may provide either an A.C. or D.C. output, depending upon the input power requirements of the device. One output terminal 15 of the power supply 14 is connected to an input terminal 17 of the transmitter 12 through a single pole, single throw switch 16 and a normally closed, sensing thermostat 18. Another output terminal 20 of the power supply 14 is connected to an input terminal 22 of the transmitter 12 by a common electrical connector 23.

A fluid circulator, such as an electrically operated, air blower 24, has one terminal connected between the switch 16 and the sensing thermostat 18 and another terminal connected to the common connector 23. The blower 24 is adapted to rotate an impeller 26 to direct a stream of cooling fluid (for example, air) onto the heat-generating equipment to be cooled, viz., the transmitter 12. Although the fluid circulator is described herein as an air blower for circulating air, the fluid circulator may be a pump-like circulator of any suitable cooling fluid, such as a liquid, for example. Means, such as a duct, represented by the dashed lines 28 and 30 in FIG. 1, may also be provided to direct the stream of the cooling fluid onto the equipment to be cooled.

Means are provided to heat the normally closed, sensing thermostat 18 to a critical temperature to open the thermostat 18 when the blower 24 is inoperative, that is, in the absence of a stream of cooling fluid directed upon the equipment (transmitter 12) to be cooled. To this end, a heater 32 is disposed in a heat-exchange relationship with the sensing thermostat 18 to heat the latter when current passes through the heater. The heater 32 may be wound around the sensing thermostat 18, as shown in FIG. 2. In the schematic diagram of FIG. 1, the heat-exchange relationship between the heater 32 and the thermostat 18 is indicated by the dashed rectangle 33. One end of the heater 32 is connected to the terminal 17 of the transmitter 12, and the other end of the heater 32 is connected to the common connector 23 through a normally closed, ambient sensing, compensating thermostat 34. Impedance means, such as a resistor 36, is connected across the compensating thermostat 34 to limit current to the heater 32 when the compensating thermostat 34 is open.

The normally closed, sensing thermostat 18 is adjusted to open by the heat supplied from the heater 32 in the event that the heater 32 is not cooled sufficiently by a stream of cooling fluid directed onto it (and also onto the transmitter 12) by the blower 24. Thus, electric current can be supplied to the transmitter 12 from the power supply 14 through both the closed switch 16 and the thermostat 18 as long as air is suitably directed onto the transmitter 12. Should the blower 24 fail to operate, or should sufficient cooling air cease to be directed onto the heater 32 to cool the latter suitably, the temperature of the thermostat 18 rises and causes it to open, thereby disconnecting the transmitter 12 from the power supply 14 and preventing the latter's overheating.

Since the equipment (transmitter 12) to be protected from overheating may operate over a range of ambient temperatures, the compensating thermostat 34 is adjusted to provide more current to the heater 32 when the transmitter is operated in an ambient below a predetermined, ambient temperature, and to provide less current to the heater 32 when the equipment is operated in an ambient above the predetermined, ambient temperature. Thus, for example, when the transmitter 12 is to be operated continuously in an ambient whose temperature may range from −30° C. to 60° C., the sensing thermostat 18 may be adjusted to open and to interrupt current to the transmitter at a temperature above 60° C., and the compensating thermostat 34 may be adjusted to open and to limit the current to the heater 32 through the resistor 36, above a temperature of 30° C. Below 30° C., the compensating thermostat 34 is closed, thereby shorting the resistor 36 and permitting more current to flow to the heater 32. Thus, the amount of current to the heater 32 is determined by the state of conduction (or non-conduction) of the compensating thermostat 34, which state, in turn, is determined by a predetermined ambient temperature. While only one compensating thermostat 34 and its accompanying shunting resistor 36 is shown connected in series with the heater 32, a plurality of compensating thermostats, each actuated at a different temperature, and shunting resistors respectively thereacross, also connected in series with the heater 32, may be employed if greater regulation of the current through the heater 32 with ambient temperature is desired.

Referring, now, to FIG. 2 of the drawing, there is shown one embodiment of a physical arrangement of the components of the fail-safe cooling apparatus 10 for cooling the transmitter 12 in accordance with the present invention. The transmitter 12 comprises a cabinet 40 formed with a plurality of inlet openings 42 in its bottom wall 44 and a plurality of outlet openings 46 in its top wall 48. A duct 50, preferably of rectangular cross-section in this embodiment, is formed, in its top wall 54, with a plurality of openings 52 that communicate with the openings 42 in the bottom wall 44 of the cabinet 40. The blower 24 is enclosed within a housing 56 formed with an outlet opening 58 in its bottom wall 60. The top wall 54 of the duct 50 is formed with an inlet opening 62 that communicates with the opening 58 in the bottom wall 60 of the housing 56. The housing 56 is formed with a large inlet opening 64 in one of its side walls behind which is disposed a suitable air filter 66 by any suitable means.

The blower 24 is disposed within the housing 56 to draw ambient air through the air filter 66 and to direct the air into the duct 50 via the openings 58 and 62. The compensating thermostat 34 and its shunting resistor 36 are disposed within the housing 56 to sense the temperature of the ambient air coming through the air filter 66.

The sensing thermostat 18 and its heater 32 are disposed within the duct 50 directly in the stream of air produced by the impeller 26 of the blower 24. In practice, the heater 32 is wound directly around, and electrically insulated from, the sensing thermostat 18. Being in the stream of the cooling fluid (air), the heater 32 is cooled sufficiently, under normal operating conditions, to prevent the sensing thermostat 18 from reaching the critical temperature at which it will disconnect the transmitter 12 from the power supply 14. Conversely, the thermostat 18 will open as a result of the heat produced by the heater 32 in the absence of cooling fluid moving over the heater 32.

After passing over the thermostat 18 and the heater 32, the stream of air moves through the openings 52 and 42 and through the cabinet 40 in succession. The moving cooling air, illustrated throughout FIG. 2 by arrows, passes over the heat-generating components, such as tubes 68 and 70 and transformer 72, for example, of the chassis 74 of the transmitter 12 to cool these components. Finally, the air, now heated, passes out of the cabinet 40 through the outlet openings 46 in its upper wall 48.

Intermittent operation of the protected equipment, the transmitter 12 in the illustrative example used herein, is possible with the illustrated fail-safe apparatus. For example, should current to the transmitter 12 be interrupted by the opening of the normally closed, sensing thermostat 18 in the event that the blower 24 fails or the air flow is impeded by some other means, current through the heater 32 also is interrupted, allowing the latter to cool and the sensing thermostat 18 to close again. The thermal lag in the operation of the thermostat 18 and the heater 32 can be adjusted by controlling the heater power, by selecting a thermostat with a suitable operating temperature, and/or by suitable spacing of the heater with respect to the thermostat. Thus, if the blower 24 fails, the transmitter 12 can be operated intermittently during periods determined by the aforementioned thermal lag.

From the foregoing description, it can be seen that there has been provided improved, fail-safe apparatus for cooling heat-generating equipment and for providing an interruption of current to the equipment in the absence of a stream of cooling fluid thereon. While only one embodiment of the circuit and only one arrangement of components of the improved, fail-safe apparatus have been shown and described, other components useful therein, as well as variations in the circuit and the arrangement of the components, all coming within the spirit of this invention, will, no doubt, readily suggest themselves to those skilled in the art. Hence, it is desired that the foregoing shall be considered as illustrative and not in a limiting sense.

What is claimed is:

1. A protective cooling system for cooling heat generating electrical equipment comprising:
   (a) a fluid circulator disposed to direct a stream of cooling fluid onto said equipment to cool the latter;
   (b) a thermostat;
   (c) a heated element disposed in a continuous heat-exchange relationship with said thermostat, said thermostat operating in response to the heat generated by said heated element, said heated element and said thermostat being disposed in said stream of cooling fluid causing said heated element to be cooled below the temperature at which said thermostat is actuated;
   (d) means to energize said fluid circulator; and
   (e) means to send current to said equipment and to said heated element through said thermostat, said thermostat being adapted to be actuated by the heat from said heated element in the absence of said stream of cooling fluid.

2. A protective cooling system as called for in claim 1 wherein the fluid circulator comprises a blower and the cooling fluid comprises a stream of air.

3. A protective cooling system as called for in claim 2 further comprising:
   (a) a second thermostat disposed in the ambient and adapted to be actuated at a lower temperature than that at which said first-mentioned thermostat is actuated; and
   (b) impedance means connected in shunt with said second thermostat and in series with said heated element.

4. In combination,
(a) a housing for a fluid circulator,
(b) a cabinet for apparatus adapted to generate heat during its operation,
(c) said housing and said cabinet being formed with openings therein,
(d) a duct formed with openings communicating with certain openings in said housing and said cabinet, said fluid circulator being disposed in said housing to direct a stream of fluid through said duct and said cabinet to cool said apparatus,
(e) a thermostat disposed in said stream of fluid,
(f) a heated disposed element in a continuous heat exchange relationship with said thermostat to heat said thermostat to a temperature that would actuate it in the absence of said stream of fluid,
(g) means to energize said fluid circulator, and
(h) means to send current to said heated element and to said apparatus through said thermostat.

References Cited by the Examiner

UNITED STATES PATENTS

| | | |
|---|---|---|
| 2,475,343 | 7/1949 | Wellman. |
| 2,851,790 | 9/1958 | Worst _____ 219—364 |
| 3,056,905 | 10/1962 | Rosenfeld et al. _____ 317—40 |

FOREIGN PATENTS 483,039  4/1938  Great Britain.

MILTON O. HIRSHFIELD, *Primary Examiner.*

R. V. LUPO, *Assistant Examiner.*